US012619359B2

(12) United States Patent
Kwon et al.

(10) Patent No.: US 12,619,359 B2
(45) Date of Patent: May 5, 2026

(54) MEMORY CONTROLLER INCLUDING ARBITER, MEMORY SYSTEM AND OPERATION METHOD OF THE MEMORY CONTROLLER

(71) Applicant: SK hynix Inc., Gyeonggi-do (KR)

(72) Inventors: Jung Hyun Kwon, Gyeonggi-do (KR); Min Seob Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 189 days.

(21) Appl. No.: 18/105,882

(22) Filed: Feb. 6, 2023

(65) Prior Publication Data

US 2024/0126443 A1 Apr. 18, 2024

(30) Foreign Application Priority Data

Oct. 13, 2022 (KR) ........................ 10-2022-0131408

(51) Int. Cl.
*G06F 3/06* (2006.01)
(52) U.S. Cl.
CPC .......... *G06F 3/0613* (2013.01); *G06F 3/0656* (2013.01); *G06F 3/0659* (2013.01); *G06F 3/0673* (2013.01)
(58) Field of Classification Search
CPC .... G06F 3/0613; G06F 3/0656; G06F 3/0659; G06F 3/0673

USPC .......................................................... 711/154
See application file for complete search history.

(56) References Cited

U.S. PATENT DOCUMENTS

| | | | | |
|---|---|---|---|---|
| 6,434,649 | B1* | 8/2002 | Baker | G06F 13/30 710/107 |
| 2003/0056034 | A1* | 3/2003 | Olds | G11B 19/02 710/5 |
| 2018/0018133 | A1* | 1/2018 | Balakrishnan | G06F 3/0611 |
| 2020/0065027 | A1 | 2/2020 | La Fratta et al. | |
| 2022/0107753 | A1 | 4/2022 | Kumar et al. | |
| 2023/0102680 | A1* | 3/2023 | Kanayama | G06F 3/0659 711/154 |

* cited by examiner

*Primary Examiner* — Pierre Vital
(74) *Attorney, Agent, or Firm* — IP & T GROUP LLP

(57) ABSTRACT

A memory controller includes: a request buffer storing read and write requests of a first rank, and read and write requests of a second rank; an arbiter determining a first request and second requests among the stored requests, the second requests to be issued after the first request according to a descending priority, such that a B request has a higher priority than a C request among the second requests; and a command generator generating commands to be issued to the first rank and the second rank according to the issue order of the first and second requests, wherein the B request is a command whose type and rank are different from those of the first request, and wherein the C request is a command whose type is the same as the type of the first request and whose rank is different from the rank of the first request.

11 Claims, 12 Drawing Sheets

FIG. 7A

|     | Request       | Order of Reception |
|-----|---------------|--------------------|
| (a) | Read, Rank 0  | 1                  |
| (b) | Write, Rank 0 | 2                  |
| (c) | Write, Rank 1 | 3                  |
| (d) | Read, Rank 1  | 4                  |
| (e) | Write, Rank 0 | 5                  |
| (f) | Read, Rank 0  | 6                  |
| (g) | Write, Rank 1 | 7                  |
| (h) | Read, Rank 1  | 8                  |

FIG. 7B

|     | Request       | Order of Issue |
|-----|---------------|----------------|
| (a) | Read, Rank 0  | 1              |
| (f) | Read, Rank 0  | 2              |
| (c) | Write, Rank 1 | 3              |
| (g) | Write, Rank 1 | 4              |
| (b) | Write, Rank 0 | 5              |
| (e) | Write, Rank 0 | 6              |
| (d) | Read, Rank 1  | 7              |
| (h) | Read, Rank 1  | 8              |

FIG. 8

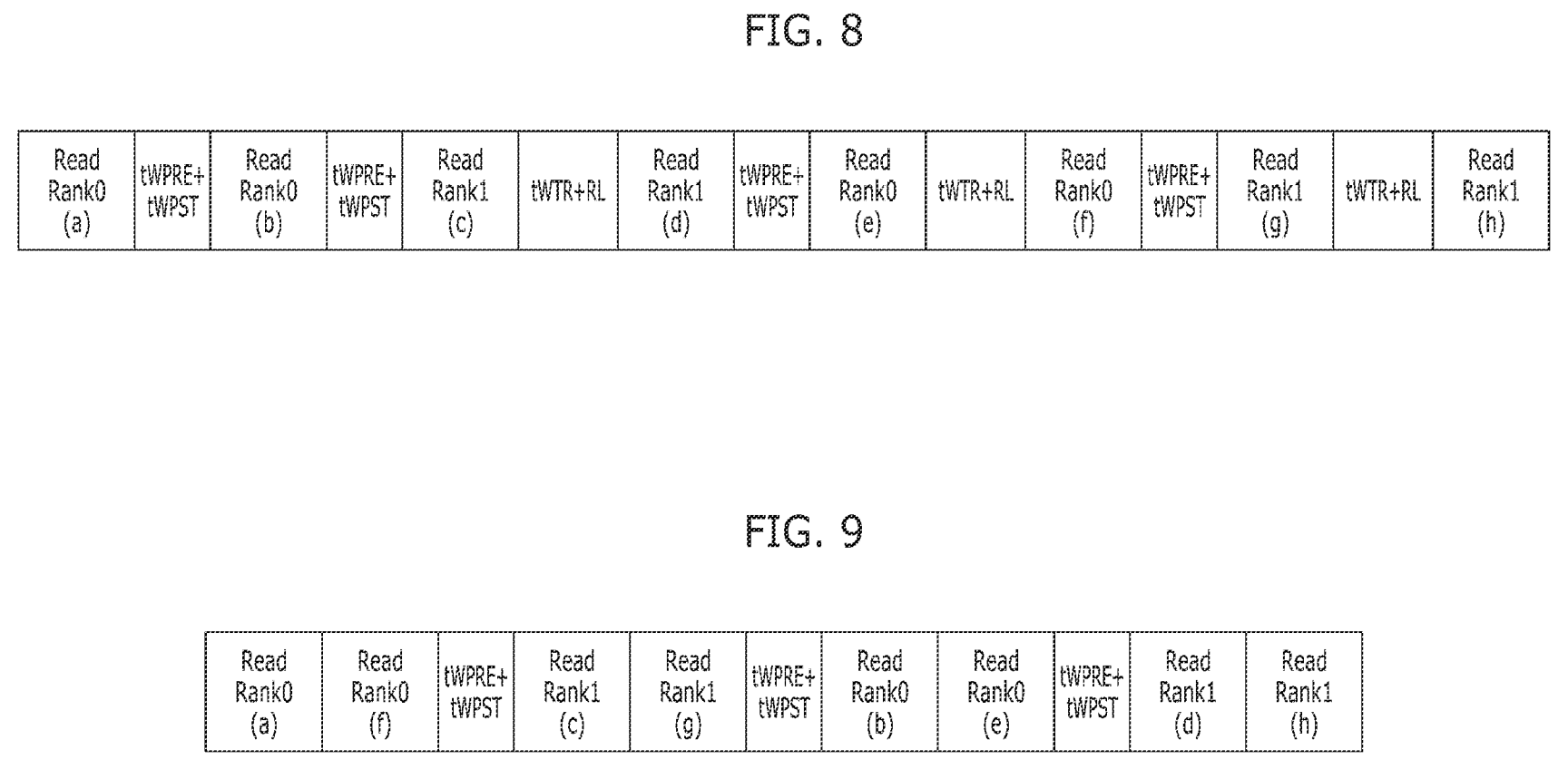

| Read Rank0 (a) | tWPRE+ tWPST | Read Rank0 (b) | tWPRE+ tWPST | Read Rank1 (c) | tWTR+RL | Read Rank1 (d) | tWPRE+ tWPST | Read Rank0 (e) | tWTR+RL | Read Rank0 (f) | tWPRE+ tWPST | Read Rank1 (g) | tWTR+RL | Read Rank1 (h) |
|---|---|---|---|---|---|---|---|---|---|---|---|---|---|---|

FIG. 9

| Read Rank0 (a) | tWPRE+ tWPST | Read Rank0 (f) | tWPRE+ tWPST | Read Rank1 (c) | Read Rank1 (g) | tWPRE+ tWPST | Read Rank0 (b) | Read Rank0 (e) | tWPRE+ tWPST | Read Rank1 (d) | Read Rank1 (h) |
|---|---|---|---|---|---|---|---|---|---|---|---|

MEMORY CONTROLLER INCLUDING ARBITER, MEMORY SYSTEM AND OPERATION METHOD OF THE MEMORY CONTROLLER

CROSS-REFERENCE TO RELATED APPLICATIONS

The present application claims priority of Korean Patent Application No. 10-2022-0131408, filed on Oct. 13, 2022, which is incorporated herein by reference in its entirety.

BACKGROUND

1. Field

Various embodiments of the present invention relate to a memory controller, and a memory system including the same.

2. Description of the Related Art

A memory controller controls read and write operations of a memory according to a request from a host. When the memory operates according to the order of the requests from the host, the performance of the memory system may be inevitably deteriorated. Therefore, it is necessary to perform scheduling in order to improve the performance of the memory system. In particular, since recent memories of memory systems are formed in multiple ranks, it is required to develop an efficient scheduling method that considers even switching between ranks.

SUMMARY

Embodiments of the present invention are directed to a technology capable of increasing the performance of a memory system.

In accordance with an embodiment of the present invention, a memory controller includes: a request buffer suitable for storing a read request and a write request of a first rank, and a read request and a write request of a second rank; an arbiter suitable for determining a first request and second requests among the stored requests, the second requests to be issued after the first request and to be issued according to a descending priority, such that a B request has a higher priority than a C request among the second requests; and a command generator suitable for generating commands to be issued to the first rank and the second rank according to the issue order of the first and second requests, wherein the B request is a command whose type and rank are different from the type and rank of the first request, and wherein the C request is a command whose type is the same as the type of the first request and whose rank is different from the rank of the first request.

In accordance with another embodiment of the present invention, a memory system includes: a first rank including one or more memories; a second rank including one or more memories; and a memory controller suitable for controlling the memories of the first rank and the memories of the second rank, wherein the memory controller includes: a request buffer suitable for storing a read request and a write request of the first rank, and a read request and a write request of the second rank transferred from a host; an arbiter suitable for determining a first request and second requests among the stored requests, the second requests to be issued after the first request and to be issued according to a descending priority, such that A, B, C and D requests sequentially have descending priorities among the second requests; and a command generator suitable for generating commands to be issued to the first rank and the second rank according to the issue order the first and second requests, wherein the A request is a command whose type and rank are the same as a type and a rank of the first request, wherein the B request is a command whose type and rank are different from the type and rank of the first request, wherein the C request is a command whose type is the same as the type of the first request and whose rank is different from the rank of the first request, and wherein the D request is a command whose type is different from the type of the first request and whose rank is the same as the rank of the first request.

In accordance with another embodiment of the present invention, a method for operating a memory controller includes: determining an issue of a first request among requests; confirming, among remaining requests, presence of A, B, C and D requests; and giving descending priorities to the A request, the B request, the C request, and the D request in a mentioned order, wherein the A request is a command whose type and rank are the same as a type and a rank of the first request, wherein the B request is a command whose type and rank are different from the type and rank of the first request, wherein the C request is a command whose type is the same as the type of the first request and whose rank is different from the rank of the first request, and wherein the D request is a command whose type is different from the type of the first request and whose rank is the same as the rank of the first request.

In accordance with another embodiment of the present invention, a method for operating a memory controller includes: determining an issue of a first request, which is a write request of a first rank; confirming presence of an A request, which is a write request of the first rank, and a B request, which is a read request of a second rank, where the A request and the B request are not scheduled; and selecting the A request as a second request to be issued after the first request.

In accordance with another embodiment of the present invention, a method for operating a memory controller includes: controlling groups of memories to perform operations by providing the groups with a sequence of commands arranged according to a descending priority, wherein, among the commands: a reference command has a highest priority, a first command of the same kind and for the same group as the reference command has a lower priority than the reference command, a second command of a different kind and for a different group from the reference command has a lower priority than the first command, a third command of the same kind as and for a different group from the reference command has a lower priority than the second command, and a fourth command of a different kind from and for the same group as the reference command has a lower priority than the third command.

BRIEF DESCRIPTION OF THE DRAWINGS

FIG. 7A shows requests transferred from a host that are stored in a request buffer in accordance with an embodiment of the present invention.

FIG. 7B shows an arbiter determining the order that the requests stored in the request buffer are issued in accordance with an embodiment of the present invention.

FIG. 8 shows an interval of a data bus when operations are performed in the order of the requests transferred from the host as shown in FIG. 7A in accordance with an embodiment of the present invention.

FIG. 9 shows an interval of a data bus when the operations are performed in the order that is scheduled by the arbiter as shown in FIG. 7B in accordance with an embodiment of the present invention.

DETAILED DESCRIPTION

Figure 1:
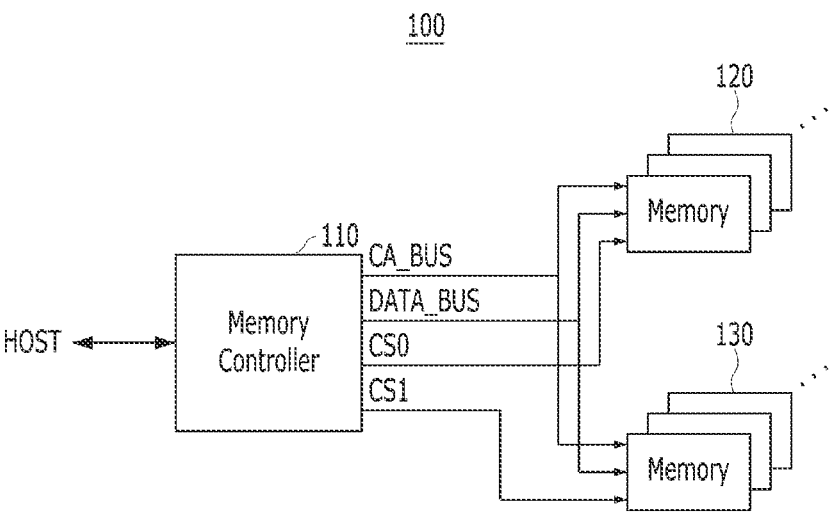
FIG. 1 is a block diagram illustrating a memory system in accordance with an embodiment of the present invention.

Various embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout this disclosure, like reference numerals refer to like parts throughout the various figures and embodiments of the present invention.

FIG. 1 is a block diagram illustrating a memory system 100 in accordance with an embodiment of the present invention.

Referring to FIG. 1, the memory system 100 may include a memory controller 110, memories 120 of a first rank, and memories 130 of a second rank.

The memory controller 110 may control the operations of the memories 120 of the first rank and the memories 130 of the second rank according to a request of a host HOST. The host HOST may include a CPU (Central Processing Unit), a GPU (Graphic Processing Unit), an AP (Application Processor), and the like. The memory controller 110 may be included in a CPU, GPU, AP, or the like. In this case, the host HOST may mean a structure other than the memory controller 110 in the CPU, GPU, AP, or the like. For example, when the memory controller 110 is included in a CPU, the host HOST in the figure may represent the constituent elements other than the memory controller 110 in the CPU. A command address bus CA_BUS may be a bus for transferring commands and addresses for directing the operations of the memories 120 of the first rank and the memories 130 of the second rank, and a data bus DATA_BUS may be a bus for transferring and receiving data to and from the memories 120 of the first rank and the memories 130 of the second rank. Chip select signals CS0 and CS1 may be signals for distinguishing ranks.

The memories 120 of the first rank may operate under the control of the memory controller 110. The memories 120 may perform the operations directed through the command/address bus CA_BUS from the memory controller 110 and transfer/receive data to/from the memory controller 110 through the data bus DATA_BUS. Each of the memories 120 commonly receives signals of the command/address bus CA_BUS and the chip select signal CS0, and the data bus DATA_BUS may be coupled to the memories 120 in a distributed manner. For example, when the number of the memories 120 is 8, the 8 memories 120 may equally receive the signals of the command/address bus CA_BUS and the chip select signal CS0. However, when the data bus DATA_BUS includes 64 data lines, 8 data lines may be coupled to each of the 8 memories 120. The memories 120 of the first rank may operate simultaneously. For example, when a write operation of the first rank is directed by the memory controller 110, the memories 120 of the first rank may simultaneously perform a write operation. When a read operation of the first rank is directed by the memory controller 110, the memories 120 of the first rank may simultaneously perform a read operation.

The memories 130 of the second rank may operate under the control of the memory controller 110. The memories 130 of the second rank may share the command/address bus CA_BUS and the data bus DATA_BUS with the memories 120 of the first rank. However, since the chip select signals CS0 and CS1 are separated for each rank, it is possible to distinguish whether the operation directed by the memory controller 110 is for the memories 120 of the first rank or the memories 130 of the second rank.

Hereinafter, how a long interval may occur between the operations will be described by referring to FIGS. 2 to 5, when a read operation and/or a write operation are/is performed in the ranks 120 and 130 of the memory system 100.

Figure 2A:
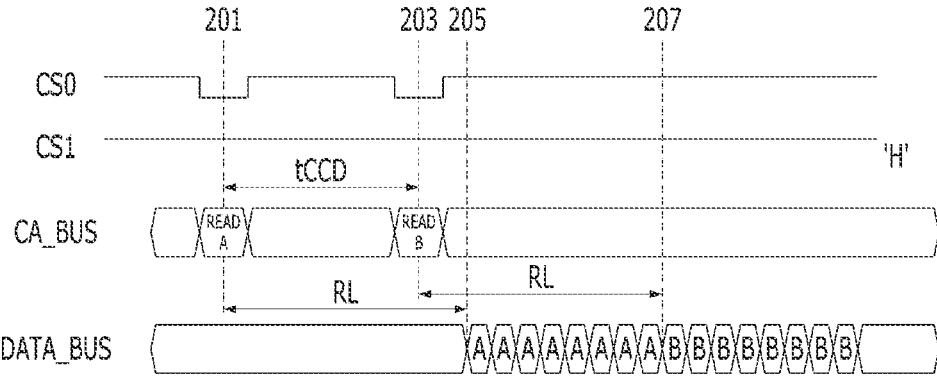
FIGS. 2A and 2B are timing diagrams illustrating an interval between operations when the same operations are consecutively performed in the same rank in accordance with an embodiment of the present invention.
Figure 2B:
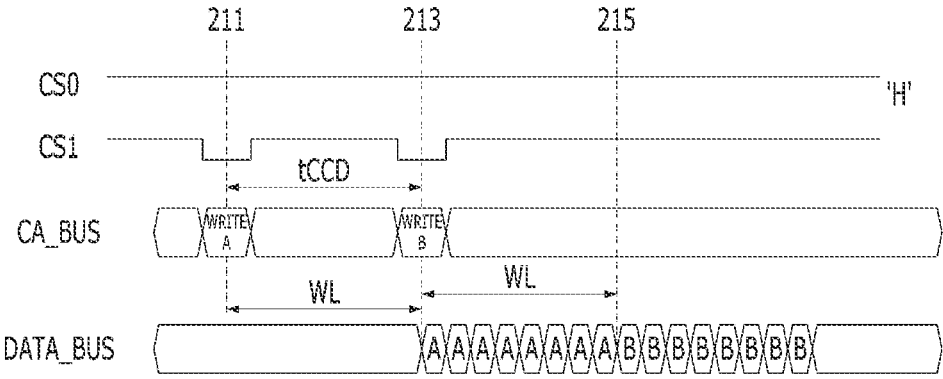

FIGS. 2A and 2B are timing diagrams illustrating an interval between the same operations when the same operations are consecutively performed in the same rank in accordance with an embodiment of the present invention.

FIG. 2A shows a case where read operations are consecutively performed in the same rank. At a moment 201, a read command READ A for the memories 120 of the first rank may be applied through the command/address bus CA_BUS. At the moment 201, since the chip select signal CS0 corresponding to the first rank is activated to a logic low level, the read command READ A at the moment 201 may direct a read operation of the memories 120 of the first rank. Data A corresponding to the read command READ A may be output from the memories 120 of the first rank to the data bus DATA_BUS from a moment 205 when a time as much as a read latency RL passes from the moment 201.

A read command READ B for the memories 120 of the first rank may be applied again through the command/address bus CA_BUS at a moment 203 when a time as much as tCCD (CAS to CAS Delay), which is the minimum time that read commands may be consecutively applied from the moment 201, passes. At the moment 203, since the chip select signal CS0 corresponding to the first rank is activated to a logic low level, the read command READ B at the moment 203 may be a command directing a read operation on the memories 120 of the first rank. Data B corresponding to the read command READ B may be output from the memories 120 of the first rank from a moment 207 when a time as much as the read latency RL passes from the moment 203.

FIG. 2B shows a case where write operations are consecutively performed in the same rank. At a moment 211, a write command WRITE A may be applied to the memories 130 of the second rank through the command/address bus CA_BUS. At the moment 211, since the chip select signal CS1 corresponding to the second rank is activated to a logic low level, the write command WRITE A at the moment 211 may be a command directing a write operation of the memories 130 of the second rank. Data A corresponding to the write command WRITE A may be transferred from the memory controller 110 to the memories 130 of the second rank through the data bus DATA_BUS.

At a moment 213 when a time as much as tCCD (CAS to CAS Delay), which is the minimum time that write commands may be consecutively applied from the moment 211, passes, a write command WRITE B for the memories 130 of the second rank may be applied again through the command/address bus CA_BUS. At the moment 213, since the chip select signal CS1 corresponding to the second rank is activated to a logic low level, the write command WRITE B at the moment 213 may be a command directing a write operation of the memories 130 of the second rank. Data B corresponding to the write command WRITE B may be transferred from the memory controller 110 to the memories 130 of the second rank through the data bus DATA_BUS from a moment 215 when a time as much as a write latency WL passes from the moment 213.

Referring to FIGS. 2A and 2B, it may be seen that the data bus DATA_BUS may be used without an interval when commands of the same type and the same rank are consecutively issued.

Figure 3A:
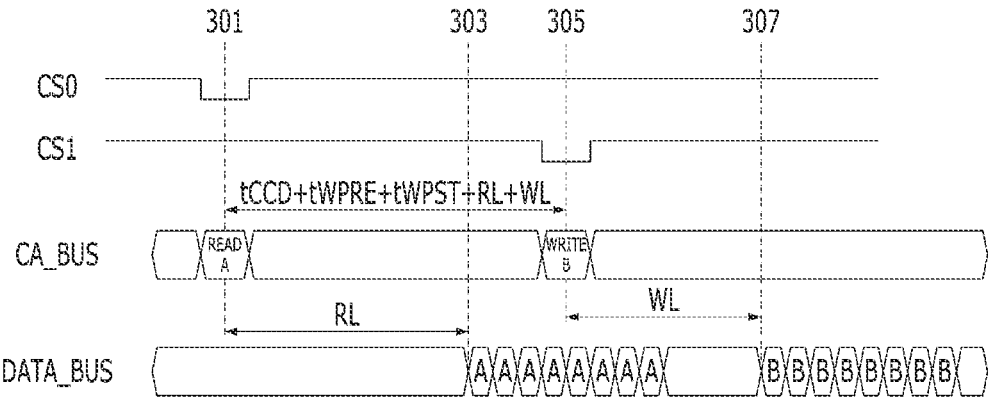
FIGS. 3A and 3B are timing diagrams illustrating intervals between operations when different operations are consecutively performed in different ranks in accordance with an embodiment of the present invention.
Figure 3B:
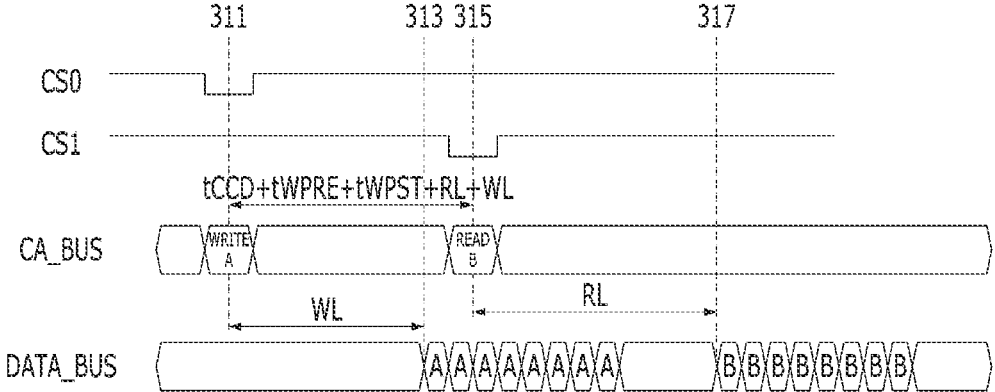

FIGS. 3A and 3B are timing diagrams illustrating intervals between operations when different operations are consecutively performed in different ranks in accordance with an embodiment of the present invention.

FIG. 3A shows a case where a read operation and a write operation are consecutively performed in different ranks. At a moment 301, a read command READ A for the memories 120 of the first rank may be applied through the command/address bus CA_BUS. At the moment 301, since the chip select signal CS0 corresponding to the first rank is activated to a logic low level, the read command READ A at the moment 301 may be a command directing a read operation of the memories 120 of the first rank. Data A corresponding to the read command READ A may be output from the memories 120 of the first rank to the data bus DATA_BUS from a moment 303 when a time as much as the read latency RL passes from the moment 301.

For switching between the ranks and between a read operation and a write operation, the time of tWPRE (Pre-Write time) and the time of tWPST (Post-Write time) for switching between activation and deactivation of a strobe signal which is used in the data bus DATA_BUS should be given. Also, considering the difference between the read latency RL and the write latency WL, the write command WRITE B for the memories 130 of the second rank may be applied through the command/address bus CA_BUS at a moment 305 when a time as much as [tCCD+tWPRE+tWPST+RL−WL] passes from the moment 301. Since the chip select signal CS1 corresponding to the second rank is activated to a logic low level at the moment 305, the write command WRITE B at the moment 305 may be a command directing a write operation of the memories 130 of the second rank. Data B corresponding to the write command WRITE B may be transferred from the memory controller 110 to the memories 130 of the second rank through the data bus DATA_BUS from a moment 307 when a time as much as the write latency WL passes from the moment 305.

FIG. 3B shows a case where a write operation and a read operation are consecutively performed in different ranks. At a moment 311, a write command WRITE A for the memories 120 of the first rank may be applied through the command/address bus CA_BUS. At the moment 311, since the chip select signal CS0 corresponding to the first rank is activated to a logic low level, the write command WRITE A at the moment 311 may be a command directing a write operation of the memories 120 of the first rank. Data A corresponding to the write command WRITE A may be transferred from the memory controller 110 to the memories 120 of the first rank through the data bus DATA_BUS from the moment 313 when the time as much as the write latency WL passes from the moment 311.

Considering the time for switching between the ranks and switching between a read operation and a write operation and the difference between the write latency and the read latency, a read command READ B for the memories 130 of the second rank may be applied through the command/address bus CA_BUS at a moment 315 when a time as much as [tCCD+tWPRE+tWPST+WL−RL] passes from the moment 311. At the moment 315, since the chip select signal CS1 corresponding to the second rank is activated to a logic low level, the read command READ B at the moment 315 may be a command directing a read operation of the memories 130 of the second rank. Data B corresponding to the read command READ B may be output from the memories 130 of the second rank to the data bus DATA_BUS from a moment 317 when the time as much as the read latency passes from the moment 315.

Referring to FIGS. 3A and 3B, it may be seen that an interval as much as [tWPRE+tWPST] occurs in the data bus DATA_BUS when different types of commands in different ranks are consecutively issued.

Figure 4A:
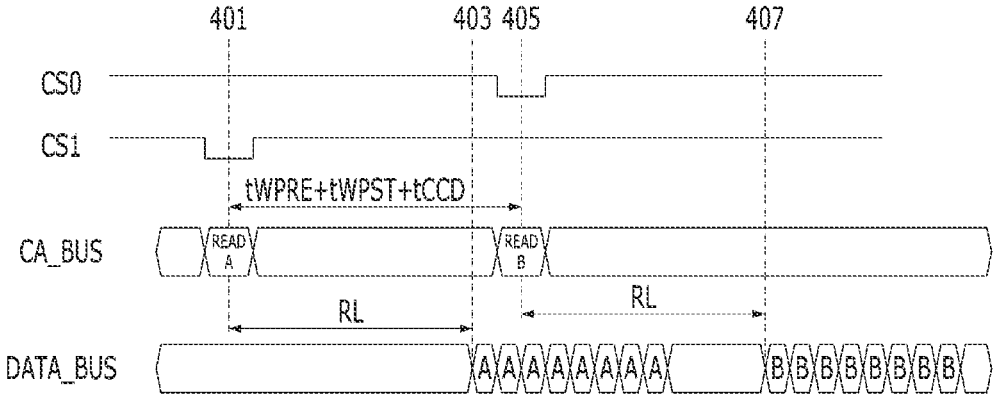
FIGS. 4A and 4B are timing diagrams illustrating an interval between operations when the same operations are consecutively performed in different ranks in accordance with an embodiment of the present invention.
Figure 4B:
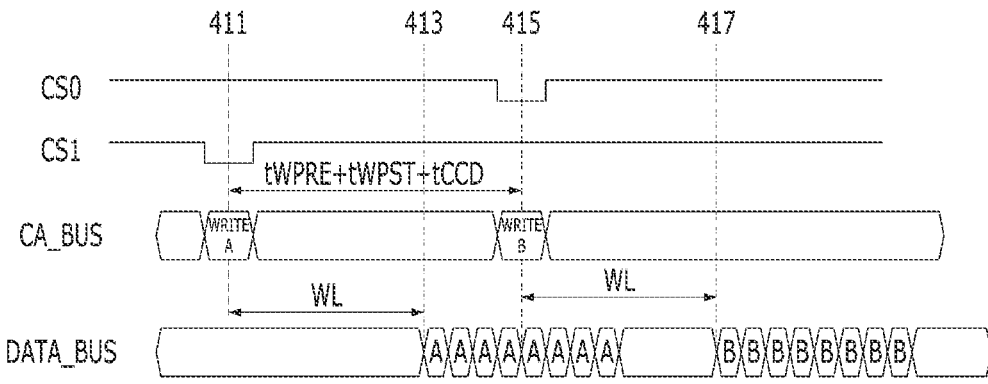

FIGS. 4A and 4B are timing diagrams illustrating an interval between operations when the same operations are consecutively performed in different ranks in accordance with an embodiment of the present invention.

FIG. 4A shows a case where read operations are consecutively performed in different ranks. At a moment 401, a read command READ A for the memories 130 of the second rank may be applied through the command/address bus CA_BUS. At the moment 401, since the chip select signal CS1 corresponding to the second rank is activated to a logic low level, the read command READ A at the moment 401 may be a command directing a read operation of the memories 130 of the second rank. Data A corresponding to the read command READ A may be output from the memories 130 of the second rank to the data bus DATA_BUS from a moment 403 when the time as much as the read latency RL passes from the moment 401.

Read command READ B for the memories 120 of the first rank may be applied through the command/address bus CA_BUS at a moment 405 when a time as much as the sum of tWPRE+tWPST and tCCD for switching between the ranks, namely, a time as much as [tWPRE+tWPST+tCCD], passes from the moment 401. At the moment 405, since the chip select signal CS0 corresponding to the first rank is activated to a logic low level, the read command READ B at the moment 405 may be a command directing a read operation of the memories 120 of the first rank. Data B corresponding to the read command READ B may be output from the memories 120 of the first rank to the data bus DATA_BUS from a moment 407 when the time as much as the read latency RL passes from the moment 405.

FIG. 4B shows a case where write operations are consecutively performed in different ranks. At a moment 411, the write command WRITE A for the memories 130 of the second rank may be applied through the command/address bus CA_BUS. At the moment 411, since the chip select signal CS1 corresponding to the second rank is activated to a logic low level, the write command WRITE A at the moment 411 may be a command directing a write operation of the memories 130 of the second rank. Data A corresponding to the write command WRITE A may be transferred from the memory controller 110 to the memories 130 of the second rank through the data bus DATA_BUS from a moment 413 when the time as much as the write latency WL passes from the moment 411.

The write command WRITE B for the memories 120 of the first rank may be applied through the command/address bus CA_BUS at a moment 415 when a time as much as the sum of tWPRE+tWPST and tCCD for switching between the ranks, namely, a time as much as [tWPRE+tWPST+tCCD], passes from the moment 411. At the moment 415, since the chip select signal CS0 corresponding to the first rank is activated to a logic low level, the write command WRITE B at the moment 415 may be a command directing a write operation of the memories 120 of the first rank. Data B corresponding to the write command WRITE B may be transferred from the memory controller 110 to the memories 120 of the first rank through the data bus DATA_BUS from a moment 417 when the time as much as the write latency WL passes from the moment 415.

Referring to FIGS. 4A and 4B, it may be seen that an interval as much as [tWPRE+tWPST] occurs in the data bus DATA_BUS when the same type of commands are consecutively issued in different ranks.

Figure 5A:
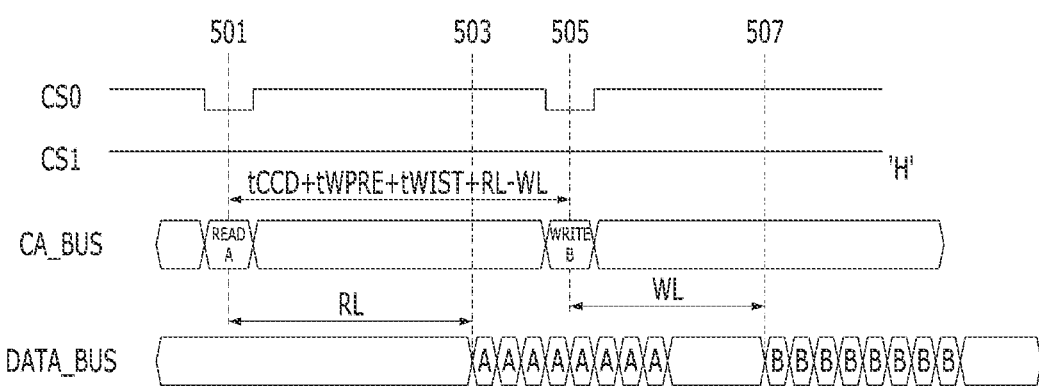
FIGS. 5A and 5B are timing diagrams illustrating intervals between operations when different operations are consecutively performed in the same rank in accordance with an embodiment of the present invention.
Figure 5B:
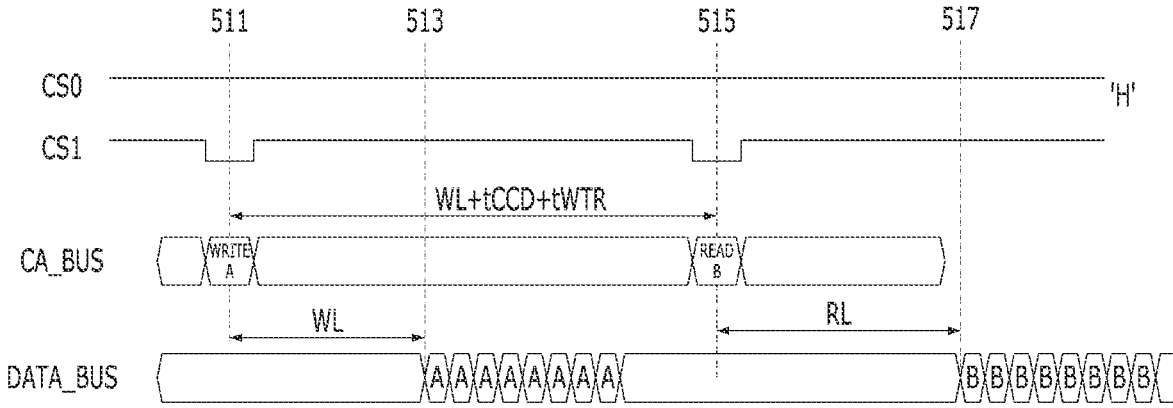

FIGS. 5A and 5B are timing diagrams illustrating intervals between operations when different operations are consecutively performed in the same rank in accordance with an embodiment of the present invention.

FIG. 5A shows a case where a read operation and a write operation are consecutively performed in the same rank. At a moment 501, a read command READ A may be applied to the memories 120 of the first rank through the command/address bus CA_BUS. At the moment 501, since the chip select signal CS0 corresponding to the first rank is activated to a logic low level, the read command READ A at the moment 501 may be a command directing a read operation of the memories 120 of the first rank. Data A corresponding to the read command READ A may be output from the memories 120 of the first rank to the data bus DATA_BUS from the moment 503 when the time as much as the read latency RL passes from the moment 501.

Considering tCCD, tWPRE, tWPST, and the difference between the read latency RL and the write latency WL from the moment 501, a write command WRITE B for the memories 120 of the first rank may be applied through the command/address bus CA_BUS at a moment 505 when a time as much as [tCCD+tWPRE+tWPST+RL−WL] passes. At the moment 505, since the chip select signal CS0 corresponding to the first rank is activated to a logic low level, the write command WRITE B at the moment 505 may be a command directing a write operation of the memories 120 of the first rank.

Data B corresponding to the write command WRITE B may be transferred from the memory controller 110 to the first-rank memories 120 through the data bus DATA_BUS from a moment 507 when the time as much as the write latency WL passes from the moment 505.

FIG. 5B shows a case where a write operation and a read operation are consecutively performed in the same rank. At a moment 511, a write command WRITE A may be applied to the memories 130 of the second rank through the command/address bus CA_BUS. At the moment 511, since the chip select signal CS1 corresponding to the second rank is activated to a logic low level, the write command WRITE A at the moment 511 may be a command directing a write operation of the memories 130 of the second rank.

Data A corresponding to the write command WRITE A may be transferred to the memories 130 of the second rank through the data bus DATA_BUS from a moment 513 when the time as much as the write latency WL passes from the moment 511.

A read command READ B for the memories 130 of the second rank may be applied through the command/address bus CA_BUS at a moment 515 when a time as much as the write latency WL, tCCD, and tWTR (Write to Read delay), which is a delay time required between a write operation and a read operation, passes from the moment 511. At the moment 515, since the chip select signal CS1 corresponding to the second rank is activated to a logic low level, the read command READ B at the moment 515 may be a command directing a read operation of the memories 130 of the second rank. Data B corresponding to the read command READ B may be transferred from the memories 130 of the second rank to the data bus DATA_BUS from a moment 517 when the time as much as the read latency RL passes from the moment 515.

Referring to FIGS. 5A and 5B, it may be seen that an interval as much as [tWPRE+tWPST] occurs in the data bus DATA_BUS when read and write commands are consecutively issued in the same rank, and an interval as much as [tWTR+RL] occurs in the data bus DATA_BUS when write and read commands are consecutively issued in the rank.

Referring to FIGS. 2A through 5B, it may be seen that the intervals between the operations A to D shown below is A<B=C≤D.

A. When the same operations are consecutively performed in the same rank (FIGS. 2A and 2B)

B. When different operations are performed consecutively in different ranks (FIGS. 3A and 3B)

C. When the same operations are consecutively performed in different ranks (FIGS. 4A and 4B)

D. When different operations are performed consecutively in the same rank (FIGS. 5A and 5B)

Accordingly, the performance of the memory system 100 may be improved as more A cases occur in the memory system 100. Also, in the case of B and C, the interval between the operations may be the same, but the more B cases occur than C cases, the fewer D cases that need to change the type of an operation may occur. Therefore, it may be advantageous that B cases occur more than C cases. That is, in order to reduce the occurrence of the worst case D where different operations are consecutively performed in the same rank as much as possible, it may be advantageous to make the B case occur more than the case C.

Namely, when the operations are scheduled with priorities in the order of A, B, C, and D in the memory system 100, the performance may be improved.

Figure 6:
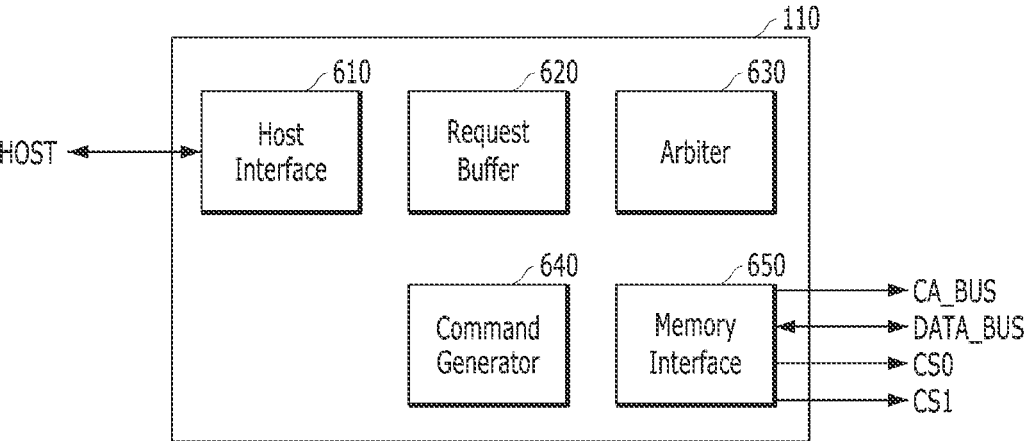
FIG. 6 is a block diagram illustrating a memory controller shown in FIG. 1 in accordance with an embodiment of the present invention.

FIG. 6 is a block diagram illustrating the memory controller 110 shown in FIG. 1 in accordance with an embodiment of the present invention.

Referring to FIG. 6, the memory controller 110 may include a host interface 610, a request buffer 620, an arbiter 630, a command generator 640, and a memory interface 650.

The host interface 610 may be an interface for communication between the host HOST and the memory controller 110. Requests may be transferred from the host HOST to the memory controller 110 through the host interface 610. Also, processing results of the requests may be transferred from the memory controller 110 to the host HOST through the host interface 610.

The request buffer 620 may store the requests transferred from the host HOST to the memory controller 110. The requests may include a read request of the first rank, a write request of the first rank, a read request of the second rank, and a write request of the second rank.

The arbiter 630 may determine an issue order of the requests stored in the request buffer 620. When the issue order of the requests is determined, the arbiter 630 may determine the issue order of the requests with a priority of A case, B case, C case, and D case in the mentioned order. When the request that is determined to be issued is a first request and a second request to be issued subsequent to the first request is determined, the arbiter 630 may give the highest priority to a request for an operation of the same type and the same rank as those of the first request, give the second highest priority to a request for an operation of a different type and a different rank from those of the first request, give the third highest priority to a request for an operation of the same type as the type of the first request in a different rank from the rank of the first request, and give the lowest priority to a request for an operation of a different type from the type of the first request in the same rank as the rank of the first request.

FIG. 7A shows requests transferred from the host HOST that are stored in the request buffer 620 in accordance with an embodiment of the present invention. The requests are received from the host in the order of (a), (b), (c), (d), (e), (f), (g), and (h). FIG. 7B shows the arbiter 630 determining the issue order of the requests stored in the request buffer 620.

Referring to FIG. 7B, the arbiter 630 may determine a request (a), which is the first request transferred from the host HOST, as a first request to be issued first. Among the remaining requests that are not issued yet, there is a request (f), which is a request for an operation of the same type and the same rank as the type and rank of the request (a). Therefore, the request (f) may be determined as the second request to be issued. Among the remaining requests that are not issued yet, there is no request for an operation of the same type and the same rank as the type and rank of the request (f), and there are the requests (c) and (g) which are given the next priority and are for an operation of different types and different ranks. Among the requests (c) and (g), since the request (c) is received first, the request (c) may be determined as the third request to be issued. Among the remaining requests, the request (g) which is for an operation of the same type and the same rank as the type and rank of the request (c) may be determined as the fourth request to be issued. Among the remaining requests, there is no request for an operation of the same type and the same rank as the type and rank of the request (g). Also, there is no request for an operation of a different type and different rank from the type and rank of the request (g). Therefore, the request (b) which is for an operation of the same type as the type of the request (g) and a different rank from the rank of the request (g) may be determined as the fifth request to be issued. Among the remaining requests, the request (e) which is for an operation of the same type and the same rank as the type and rank of the request (b) may be determined as the sixth request to be issued. Among the remaining requests, there is no request for an operation of the same type and the same rank as the type and rank of the request (e), and there is no request for an operation of a different type and a different rank from the type and rank of the request (e), and there is no request for an operation of the same type as the type of the request (e) and a different rank from the rank of the request (e). Accordingly, the request (d) which is for an operation of a different type from the type of the request (e) and the same rank as the rank of the request (e) may be determined as the seventh request to be issued. Finally, the request (h) which is for an operation of the same type and the same rank as the type and rank of the request (d) may be determined as the eighth request to be issued.

In this way, the arbiter 630 may determine the issue order of the requests with the priority in the mentioned order of the A case, the B case, the C case, and the D case. When the arbiter 630 determines the issue order of the requests, the arbiter 630 may use not only the above-described policy but also other policies as well. For example, the arbiter 630 may assign 7 points to the A case, 5 points to the B case, 3 points to the C case, and 1 point to the D case, assign each case a different score according to another policy, and determine the issue order in order of the highest scores.

Referring back to FIG. 6, the command generator 640 may generate commands to be applied to the memories 120 of the first rank and the memories 130 of the second rank according to the issue order which is determined by the arbiter 630.

The memory interface 650 may be provided for an interface between the memory controller 110 and the memories 120 of the first rank and the memories 130 of the second rank. The memory interface 650 may contribute to transferring commands and addresses from the memory controller 110 to the memories 120 of the first rank and the memories 130 of the second rank through the command/address bus CA_BUS. Also, the memory interface 650 may contribute to transferring and receiving data to and from the memories 120 of the first rank and the memories 130 of the second rank through the data bus DATA_BUS. The memory interface 650 may also be referred to as a PHY interface.

FIG. 8 shows the interval of the data bus DATA_BUS when operations are performed in the order of the requests transferred from the host as shown in FIG. 7A in accordance with an embodiment of the present invention. Referring to FIG. 8, it may be seen that many intervals occur on the data bus DATA_BUS between the operations.

FIG. 9 shows the interval of the data bus DATA_BUS when the operations are performed in the order that is scheduled by the arbiter 630 as shown in FIG. 7B in accordance with an embodiment of the present invention. Referring to FIG. 9, it may be seen that the interval of the data bus DATA_BUS between the operations is significantly reduced compared to what is shown in FIG. 8. As such, when the above-described scheduling policy is applied, it may be seen that the interval of the data bus DATA_BUS is reduced and the performance of the memory system 100 is increased. Also, since the above-described scheduling policy has a tendency to change the rank and the type of the operation as much as possible, read and write operations may be equally performed in several ranks.

According to the embodiments of the present invention, the performance of a memory system may be increased.

While the present invention has been described with respect to the specific embodiments, it will be apparent to those skilled in the art that various changes and modifications may be made without departing from the spirit and scope of the invention as defined in the following claims. Furthermore, the embodiments may be combined to form additional embodiments.

US 12,619,359 B2

11

12

What is claimed is:

1. A memory controller, comprising:

a request buffer suitable for storing a read request and a write request of a first rank associated with operations of a first memory, and a read request and a write request of a second rank associated with operations of a second memory;

an arbiter suitable for determining a first request and second requests among the stored requests, the second requests to be issued after the first request and to be issued according to a descending priority, wherein A, B, C and D requests of the second requests have sequentially descending priorities; and a command generator suitable for generating commands to be issued to the first rank for the operations of the first memory and the second rank for the operations of the second memory according to the issue order of the first and second requests, wherein the A request is a first highest priority command whose type and rank are the same as a type and a rank of the first request, wherein the B request is a second highest priority command, of lower priority than the A request and issued after the A request, whose type and rank are different from the type and rank of the first request, and wherein the C request is a third highest priority command, of lower priority than the B request and issued after the B request, whose type is the same as the type of the first request and whose rank is different from the rank of the first request, and wherein the D request is a fourth highest priority command, of lower priority than the C request and issued after the C request, whose type is different from the type of the first request and whose rank is the same as the rank of the first request.

2. The memory controller of claim 1, further comprising:

a host interface suitable for receiving the requests from a host; and a memory interface suitable for transferring the commands to the first a-memory of the first rank and the second a memory of the second rank.

3. A memory system, comprising:

a first rank associated with operations of a first memory;

a second rank associated with operations of a second memory; and a memory controller suitable for controlling the memories of the first rank and the memories of the second rank, wherein the memory controller includes:

a request buffer suitable for storing a read request and a write request of the first rank, and a read request and a write request of the second rank transferred from a host;

an arbiter suitable for determining a first request and second requests among the stored requests, the second requests to be issued after the first request and to be issued according to a descending priority, wherein A, B, C and D requests of the second requests have sequentially descending priorities; and a command generator suitable for generating commands to be issued to the first rank for the operations of the first memory and the second rank for the operations of the second memory according to the issue order of the first and second requests, wherein the A request is a first highest priority command whose type and rank are the same as a type and a rank of the first request, wherein the B request is a second highest priority command, of lower priority than the A request and issued after the A request, whose type and rank are different from the type and rank of the first request, wherein the C request is a third highest priority command, of lower priority than the B request and issued after the B request, whose type is the same as the type of the first request and whose rank is different from the rank of the first request, and wherein the D request is a fourth highest priority command, of lower priority than the C request and issued after the C request, whose type is different from the type of the first request and whose rank is the same as the rank of the first request.

4. The memory system of claim 3, wherein the memory controller further includes:

a host interface suitable for receiving the requests from the host; and a memory interface suitable for transferring the commands to the first rank and the second rank.

5. A method for operating a memory controller, comprising:

determining an issue order of a first request among requests;

confirming, among remaining requests, presence of A, B, C and D requests; and giving descending priorities to the A request, the B request, the C request, and the D request, wherein the A request is a first highest priority command whose type and rank are the same as a type and a rank of the first request associated with operations of a first memory, wherein the B request is a second highest priority command, of lower priority than the A request and issued after the A request, whose type and rank associated with operations of a second memory are different from the type and rank of the first request, wherein the C request is a third highest priority command, of lower priority than the B request and issued after the B request, whose type is the same as the type of the first request and whose rank associated with operations of a second memory is different from the rank of the first request, and wherein the D request is a fourth highest priority command, of lower priority than the C request and issued after the C request, whose type is different from the type of the first request and whose rank is the same as the rank of the first request.

6. The method of claim 5, further comprising determining one among the remaining requests as a second request which is to be issued after the first request based on the priority.

7. The method of claim 6, further comprising receiving the first request, the A request, the B request, the C request, and the D request from a host, before the determining of the issue order of the first request.

8. The method of claim 7, further comprising, after the determining of the second request:

issuing a command corresponding to the first request; and issuing a command corresponding to the second request.

9. A method for operating a memory controller, comprising:

determining an issue order of a first request, which is a write request of a first rank associated with operations of a first memory;

confirming presence of A, B, C, D and E requests, wherein the A request is a write request of the first rank, the B request is a read request of a second rank associated with operations of a second memory, the C request is a write request of the second rank, the D request is a read request of the first rank, and the E request is a write request of the first rank;

selecting the A request as a second request to be issued after the first request;

selecting the B request, of lower priority than the A request, as a third request to be issued after the second request; and selecting the E request, of lower priority than the B request, as a fourth request to be issued after the third request.

10. The method of claim 9, further comprising:

selecting the C request as a fifth request to be issued after the fourth request.

11. The method of claim 9, further comprising:

selecting the D request as a sixth request to be issued after the fifth request.

\* \* \* \* \*